US011146306B2

(12) United States Patent
Lu et al.

(10) Patent No.: US 11,146,306 B2
(45) Date of Patent: Oct. 12, 2021

(54) ISOLATION AMONG I/O PORTS

(71) Applicant: QUALCOMM Incorporated, San Diego, CA (US)

(72) Inventors: Chao Lu, Pleasanton, CA (US); William Si, Saratoga, CA (US); Shahram Abdollahi-Alibeik, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/248,270

(22) Filed: Jan. 15, 2019

(65) Prior Publication Data

US 2020/0228158 A1 Jul. 16, 2020

(51) Int. Cl.
*H04B 1/525* (2015.01)
*H04B 1/401* (2015.01)
*H04B 1/48* (2006.01)

(52) U.S. Cl.
CPC ............. *H04B 1/525* (2013.01); *H04B 1/401* (2013.01); *H04B 1/48* (2013.01); *H04B 2001/485* (2013.01)

(58) Field of Classification Search
CPC .......... H04B 1/525; H04B 1/401; H04B 1/48; H04B 2001/485
USPC .......................................................... 455/78
See application file for complete search history.

(56) References Cited

U.S. PATENT DOCUMENTS

| | | | |
|---|---|---|---|
| 8,547,137 B2 | 10/2013 | Ando | |
| 9,641,205 B1* | 5/2017 | Hyun | ..................... H04B 1/406 |
| 9,893,025 B2 | 2/2018 | Atesal et al. | |
| 10,033,429 B2 | 7/2018 | Wu et al. | |
| 10,374,306 B2* | 8/2019 | Zhang | ..................... H01Q 1/521 |
| 2010/0327922 A1* | 12/2010 | Ando | ................... G11C 7/1051 |
| | | | 327/141 |
| 2011/0025435 A1 | 2/2011 | Gorbachov | |
| 2011/0228713 A1* | 9/2011 | Alexopoulos | .......... H01Q 1/521 |
| | | | 370/297 |
| 2012/0254816 A1 | 10/2012 | Brink et al. | |
| 2015/0139122 A1 | 5/2015 | Rimini et al. | |

(Continued)

FOREIGN PATENT DOCUMENTS

EP 3267531 A1 1/2018

OTHER PUBLICATIONS

International Search Report and Written Opinion—PCT/US2020/013464—ISA/EPO—dated May 8, 2020.

*Primary Examiner* — Yuwen Pan
*Assistant Examiner* — Angelica M Perez
(74) *Attorney, Agent, or Firm* — Loza & Loza, LLP

(57) ABSTRACT

Methods and apparatuses to adjust isolation between I/O ports. An apparatus includes a die, a first input or output (I/O) port, a second I/O port, and a third I/O port. The second I/O port is between the first I/O port and the third I/O port. A variable capacitor is electrically connected to the second I/O port and is configurable to adjust isolation between the first I/O port and the third I/O port. A method includes performing, by a die, a first RF function via a first I/O port; tuning a variable capacitor electrically connected to a second I/O port to adjust isolation between the first I/O port and a third I/O port, the second I/O port being between the first I/O port and the third I/O port; and performing, by the die, a second RF function via a third I/O port.

33 Claims, 9 Drawing Sheets

(56) References Cited

U.S. PATENT DOCUMENTS

2015/0340769 A1* 11/2015 Desclos ............ H01Q 21/0006
                                                            343/745
2018/0006618 A1*  1/2018 Mohta .................. H04B 1/0458
2018/0175792 A1   6/2018 Yang

* cited by examiner

ISOLATION AMONG I/O PORTS

BACKGROUND

Field

The present disclosure relates generally to methods and apparatuses with improved isolation among input or output (I/O) ports and in particular improving isolation by operation of an isolation circuit.

Background

A computing device (e.g., a laptop, a mobile phone, etc.) may perform various functions, such as telephony, wireless data access, and camera/video function, etc. Such computing device may include a variety of components including circuit boards, integrated circuit (IC) devices and/or System-on-Chip (SoC) devices. Increasingly, modern applications demand higher performance while reducing physical dimensions of such computing device. Components of the computing are placed in closer proximity, resulting in undesired coupling. An example of coupling may be transfer of electrical energy from one component to another. Undesired coupling may be unintended and/or coupling that interference with intended operations of the computing device.

One such example is a transceiver configured to transmit and to receive radio frequency (RF) signals based on multiple RF communication standards and/or using multiple antennas (e.g., operating a multiple-input and multiple output system). Thus, an apparatus incorporating the transceiver may include multiple chains (e.g., collections of circuits to transmit and/or to receive RF signals). Coupling among the chains, even on a package, is a concern. For example, the transceiver may be incorporated within a device, and such device may be a packaged chip, a multi-die assembly (e.g., a die stack or a multi-die package), a multi-chip assembly (e.g., a chip stack or package-on-package assembly), and/or a mixed-die-chip assembly. Coupling among I/O pins, I/O bond pads, and/or wirings outside of the transceiver may result from proximity of those elements. Coupling among different (e.g., RF) functions may degrade performance of the device. Improved isolation for such device is needed.

SUMMARY

This summary identifies features of some example aspects and is not an exclusive or exhaustive description of the disclosed subject matter. Additional features and aspects are described and will become apparent to persons skilled in the art upon reading the following detailed description and viewing the drawings that form a part thereof.

An apparatus in accordance with at least one embodiment includes a first input or output (I/O) port, a second I/O port, and a third I/O port. The second I/O port is between the first I/O port and the third I/O port. The apparatus further includes a variable capacitor electrically connected to the second I/O port and configurable to adjust isolation between the first I/O port and the third I/O port.

Another apparatus in accordance with at least one embodiment includes a memory, at least one processor coupled to the memory, a first I/O port, a second I/O port, and a third I/O port. The at least one processor is configured to, at least in part with the memory, perform a first RF function via the first I/O port and tune a variable capacitor to adjust isolation between the first I/O port and the third I/O port. The variable capacitor is electrically connected to the second I/O port, and the second I/O port is between the first I/O port and the third I/O port. The at least one processor is further configured to, at least in part with the memory, perform a second RF function via the third I/O port.

A method to adjust isolation among I/O ports, in accordance with at least one embodiment, includes performing, by a die, a first RF function via a first I/O port; tuning a variable capacitor electrically connected to a second I/O port to adjust isolation between the first I/O port and a third I/O port, the second I/O port being between the first I/O port and the third I/O port; and performing, by the die, a second RF function via the third I/O port.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
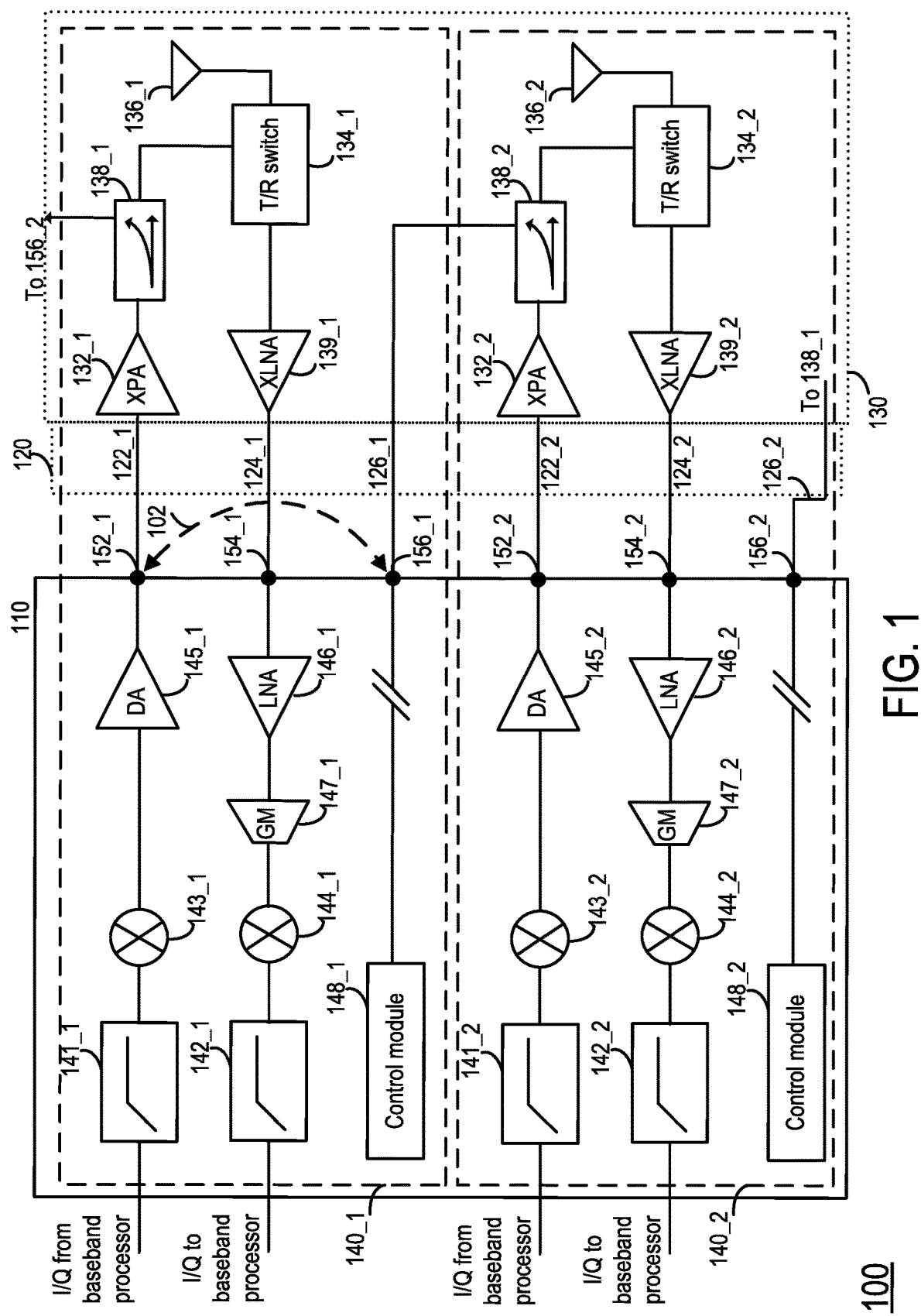
FIG. 1 illustrates components of an apparatus with coupling between chains of RF circuits.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. are employed for ease of reference and may not carry substantive meanings. Likewise, names for components/modules may be adopted for ease of reference and might not limit the components/modules. For example, such non-limiting names may include "control" module. Modules and components presented in the disclosure may be implemented in hardware, software, or a combination of hardware and software.

The term "bus system" may provide that elements coupled to the "bus system" may exchange information therebetween, directly or indirectly. In such fashion, the "bus system" may encompass multiple physical connections as well as intervening stages such as buffers, latches, registers, etc.

Methods and apparatuses for adjusting isolation (e.g., to improve isolation by reducing coupling) among I/O ports are presented herein. The I/O ports may be I/O pond pads on a semiconductor die (hereinafter "die") or I/O pins (e.g., pins, balls, or stubs, etc.) on a device. The device may be, for example, a package chip (herein after "chip"), a multi-die assembly, a multi-chip assembly, and/or a mixed-die-chip assembly, etc. The device may, for example, incorporate the die, and the die may include a transceiver. The transceiver may include at least one processor coupled to a memory. The presented methods and apparatus for adjusting isolation may further improve coupling among wirings outside of the die (e.g., bond wires, conductive pillars, interconnects on an interposer, etc.).

FIG. 1 illustrates components of an apparatus 100 with coupling between chains of RF circuits. The apparatus 100 may, for example, be one of a computing system (e.g., servers, datacenters, desktop computers), mobile computing device (e.g., laptops, cell phones, vehicles, etc.), Internet of Things device, virtual reality system, or augmented reality system. The apparatus 100 may include some or all of a device 110, wiring 120 outside of the device, and a circuit board 130 (e.g., a printed circuit board or PCB). The device 110 may be, for example, a die, a chip incorporating the die, a multi-die assembly (e.g., a package containing multiple dies), a multi-chip assembly incorporating multiple dies (e.g., an assembly of package-on-package chips), and/or a mixed-die-chip assembly. The wiring 120 outside of the device 110 (e.g., outside of the die incorporated within the device) may electrically connect the device 110 to the circuit board 130 and may be, for example, bond wires, conductive pillars, interconnects on an interposer, etc.

The apparatus 100 may further include multiple chains of radio frequency (RF) circuits. A chain may be a collection of circuits for performing various RF functions, such as transmitting or receiving RF signaling. As illustrates, the apparatus 100 includes a first chain of RF circuits 140_1 and a second chain of RF circuits 140_2. In some examples, the first chain of RF circuits 140_1 and the second chain of RF circuits 140_2 may be part of a multiple-input and multiple-output (MIMO) system and as such, perform MIMO functions. In some examples, each of the first chain of RF circuits 140_1 and the second chain of RF circuits 140_2 may be configured for transmission or receiving of RF signaling of different wireless radio technologies, such as Wi-Fi or cellular telephony. In some examples, each of the first chain of RF circuits 140_1 and the second chain of RF circuits 140_2 may be part of a transceiver on a die. In some examples, the first chain of RF circuits 140_1 or the second chain of RF circuits 140_2 may be configured for transmission or receiving of RF signaling via wireline interface.

The first chain of RF circuits 140_1 may include various circuits on the device 110 for RF signal transmission and/or receiving. For example, the first chain of RF circuits 140_1 may include filters (e.g., a transmission filter 141_1 and a receiver filter 142_1), mixers (e.g., a transmission mixer 143_1 and a receiver filter 144_1), and/or amplifiers (e.g., a driver amplifier 145_1, a low-noise amplifier 146_1, a transconductance amplifier 147_1). The first chain of RF circuits 140_1 may further include a control module 148_1 configured to control, at least in part, RF functions of the first chain of RF circuits 140_1.

The second chain of RF circuits 140_2 may include filters (e.g., a transmission filter 141_2 and a receiver filter 142_2), mixers (e.g., a transmission mixer 143_2 and a receiver filter 144_2), and/or amplifiers (e.g., a driver amplifier 145_2, a low-noise amplifier 146_2, a transconductance amplifier 147_2). The second chain of RF circuits 140_2 may further include a control module 148_2 configured to control, at least in part, RF functions of the first chain of RF circuits 140_2.

The device 110 may be electrically connected to the circuit board 130 via the wiring 120 outside of the device 110 and input and/or output ports (I/O ports). The I/O ports 152_1, 154_1, 156_1, 152_2, 154_2, and/or 156_2 may be I/O pads on a die within the device 110, and the first chain of RF circuits 140_1 and the second chain of RF circuits 140_2 may be part of the die. In some examples, the I/O ports may be pins of device 110 (pins may broadly refer to I/O interconnects into and/or out of the device 110, such as pins, balls, stubs, etc.). The wiring 120 outside of the device 110 may include a wiring 122_1, 124_1, 126_1, 122_2, 124_2, and/or 126_2.

The first chain of RF circuits 140_1 may include an I/O port 152_1 electrically connected to the wiring 122_1. The I/O port 152_1 and the wiring 122_1 may be configured to provide RF signals for transmission. The first chain of RF circuits 140_1 may include an I/O port 154_1 electrically connected to the wiring 124_1. The I/O port 154_1 and the wiring 124_1 may be configured to provide received RF signals to the device 110. The first chain of RF circuits 140_1 may further include an I/O port 156_1 configured to carry information of RF signals transmitted by the second chain of RF circuits 140_2. Accordingly, the I/O port 156_1 may be electrically connected to a signal coupler 138_2 of the second chain of RF circuits 140_2. The second chain of RF circuits 140_2 may be similarly connected, and discussion thereof is omitted.

The circuit board 130 may include certain components affixed thereto as part of the RF circuit chains. For example, the first chain of RF circuits 140_1 may include an external power amplifier 132_1 configured to amplify transmission signals; an external low-noise amplifier 139_1 configured to amplify received signals; and/or an antenna 136_1 configured to transmit (e.g., to radiate) and to receive RF signals over the air. The first chain of RF circuits 140_1 may also include a signal coupler 138_1 configured to provide information on the transmission RF signals and a transmission/receiving switch 134_1 (e.g., a duplexer) configured to switch a signal path for the antenna 136_1 between transmission and receiving functions. The external power amplifier 132_1, the external low-noise amplifier 139_1, the antenna 136_1, the signal coupler 138_1, and/or the transmission/receiving switch 134_1 may be affixed onto the circuit board 130.

The second chain of RF circuits 140_2 may include an external power amplifier 132_2 configured to amplify transmission signals; an external low-noise amplifier 139_2 configured to amplify received signals; and/or an antenna 136_2 configured to transmit (e.g., to radiate) and to receive RF signals over the air. The second chain of RF circuits 140_2 may also include a signal coupler 138_2 configured to provide information on the transmission RF signals and a transmission/receiving switch 134_2 (e.g., a duplexer) configured to switch a signal path for the antenna 136_2 between transmission and receiving functions. The external power amplifier 132_2, the external low-noise amplifier 139_2, the antenna 136_2, the signal coupler 138_2, and/or the transmission/receiving switch 134_2 may be affixed onto the circuit board 130.

The wiring 120 outside of the device 110 may include various wirings electrically connecting the device 110, via the I/O ports, to the components affixed to the circuit board 130. The wiring 120 may include, for example, bond wires, bumps, connective traces on interposers, pillars, etc. In some examples, the wiring 120 may include electrical connections between a die/chip to another die/wafer/chip/circuit board. For example, the first chain of RF circuits 140_1 may include the wiring 122_1 to electrically connect the I/O port 151_1 to a component (e.g., to the external power amplifier 132_1) on the circuit board 130. The wiring 122_1 may be configured to provide RF transmission signals to the antenna 136_1, via the signal coupler 138_1. The first chain of RF circuits 140_1 may further include the wiring 124_1 to electrically connect the I/O port 154_1 to a component (e.g., to the external low-noise amplifier 139_1) on the circuit board 130. The wiring 124_1 may be configured to provide received RF signals from the antenna 136_1, via the transmission/receiving switch 134_1.

The wiring 120 outside of the device 110 may further include the wiring 126_1 to electrically connect the I/O port 156_1 to, for example, the signal coupler 138_2 (of the second chain of RF circuits 140_2). The wiring 126_1 may be configured to provide, to the first chain of RF circuits 140_1 on the device 110, signaling information (e.g., power and/or signal quality information) of the RF transmission signals of the second chain of RF circuits 140_2. In some examples, the control module 148_1 may be coupled to the I/O port 156_1 (e.g., via various components not shown) and configured to determine power and/or signal quality of RF transmission signals of the second chain of RF circuits 140_2 (e.g., for MIMO functions).

The second chain of RF circuits 140_2 may include the wiring 122_2 to electrically connect the I/O port 151_2 to a component (e.g., to the external power amplifier 132_2) on the circuit board 130. The wiring 122_2 may be configured to provide RF transmission signals to the antenna 136_2, via the signal coupler 138_2. The first chain of RF circuits 140_2 may further include the wiring 124_2 to electrically connect the I/O port 154_2 to a component (e.g., to the external low-noise amplifier 139_2) on the circuit board 130. The wiring 124_2 may be configured to provide received RF signals from the antenna 136_2, via the transmission/receiving switch 134_2.

The wiring 120 outside of the device 110 may further include the wiring 126_2 to electrically connect the I/O port 156_2 to, for example, the signal coupler 138_1 (of the first chain of RF circuits 140_1). The wiring 126_2 may be configured to provide, to the second chain of RF circuits 140_2 on the device 110, signaling information (e.g., power and/or signal quality information) of the RF transmission signals of the first chain of RF circuits 140_1. In some examples, the control module 148_2 may be coupled to the I/O port 156_2 (e.g., via various components not shown) and configured to determine power and/or signal quality of RF transmission signals of the first chain of RF circuits 140_1 (e.g., for MIMO functions).

As dimensions of apparatus 100 decrease, and demands for performance increase, coupling among the I/O ports and/or among the wiring 120 becomes increasingly disruptive. For example, the device 110 may include a transceiver, and undesired coupling between different signals paths may cause performance of certain RF functions to degrade. FIG. 1 illustrates a potential, undesirable coupling 102 (shown by dash arrows) at least in part outside of the device 110 (e.g., between the I/O port 152_1 and the I/O port 156_1 or between the wiring 122_1 and the wiring 126_1). The coupling 102 may be unintended and causing impairment of intended RF functions. For example, the coupling 102 may impair residual sideband calibration, cause error vector magnitude degradation or Spectrum Emission Mask violation in a MIMO system, reduce power control accuracy, cause a receiver path de-sensing in a Frequency Division Duplex system, and/or degrade noise figure, etc.

Figure 2:
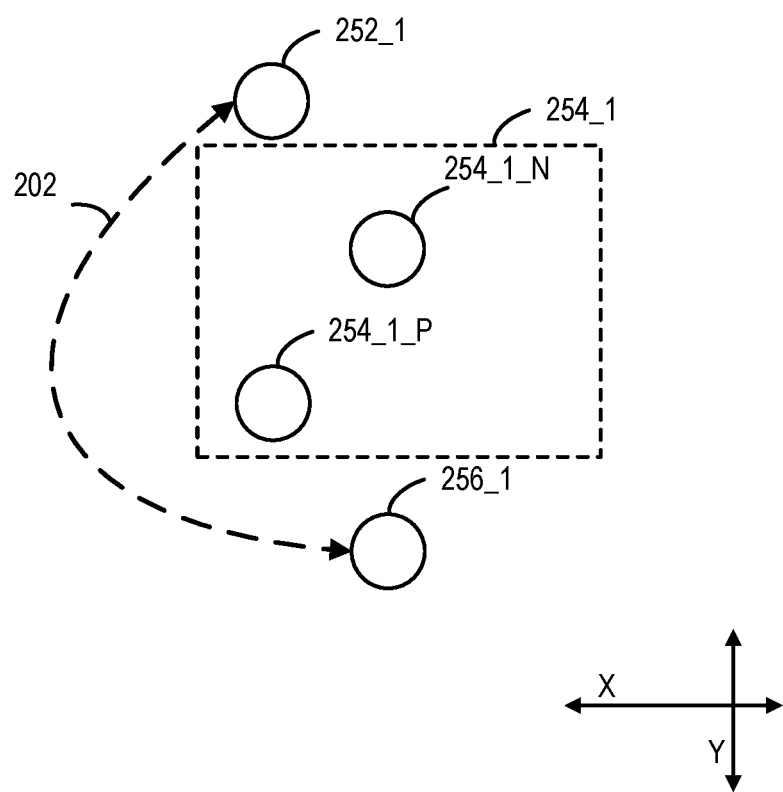
FIG. 2 illustrates I/O ports placement of the device of FIG. 1

FIG. 2 illustrations I/O ports placement of the device 110 of FIG. 1. For examples, the I/O ports may be I/O pins (pin, balls, stubs, etc.) of the device 110 or I/O bond pads of a die incorporated within the device 110. X-axis is shown in the horizontal direction, and Y-axis is shown in the vertical direction. FIG. 2 includes an I/O port 252_1 (which may be an instance of the I/O port 152_1 of FIG. 1) and I/O port 254_1 (which may be an instance of the I/O port 154_1 of FIG. 1). The I/O port 254_1 may include a positive terminal 254_1_P and a negative terminal 254_1_N. In other words, the received RF signals may be differential signals (see FIG. 1). FIG. 2 further includes an I/O port 256_1, which may be an instance of the I/O port 156_1 of FIG. 1.

A potential coupling 202 is shown between the I/O port 252_1 and the I/O port 256_1. The coupling 202 may be due to coupling between the I/O port 252_1 and the I/O port 256_1 or due to coupling between the wiring 120 coupled to the respective I/O ports 252_1 and 256_1. The coupling 202 may thus occur outside of the device 110. Due to proximity between the I/O port 252_1 and the I/O port 256_1, isolation therebetween may be about 20 dB. In an example, the first chain of RF circuits 140_1 (FIG. 1; the I/O port 252_1 as an instance of the I/O port 152_1) may couple to the second chain of RF circuits 140_2 (FIG. 1; the I/O port 256_1 as an instance of the I/O port 156_1 coupled to the second chain of RF circuits 140_2).

The potential coupling 202 of the first chain of RF circuits 140_1 and the second chain of RF circuits 140_2 may lead to spectrum emission mask (SEM) violation and/or EVM degradation. To address these issues, the isolation between the I/O port 252_1 and the I/O port 256_1 preferably should be greater than 40 dB. To achieve such isolation performance, the distance between the I/O port 252_1 and the I/O port 256_1 may need to substantially increase. Such solution may be unpractical for modern devices. For example, in order to achieve the 40-dB isolation, the distance between the I/O port 252_1 and the I/O port 256_1 may need to be increased six times from a minimum distance allowed by a assembling technology. A resulting increase in size of the device and added expense are not viable for modern applications.

Figure 3:
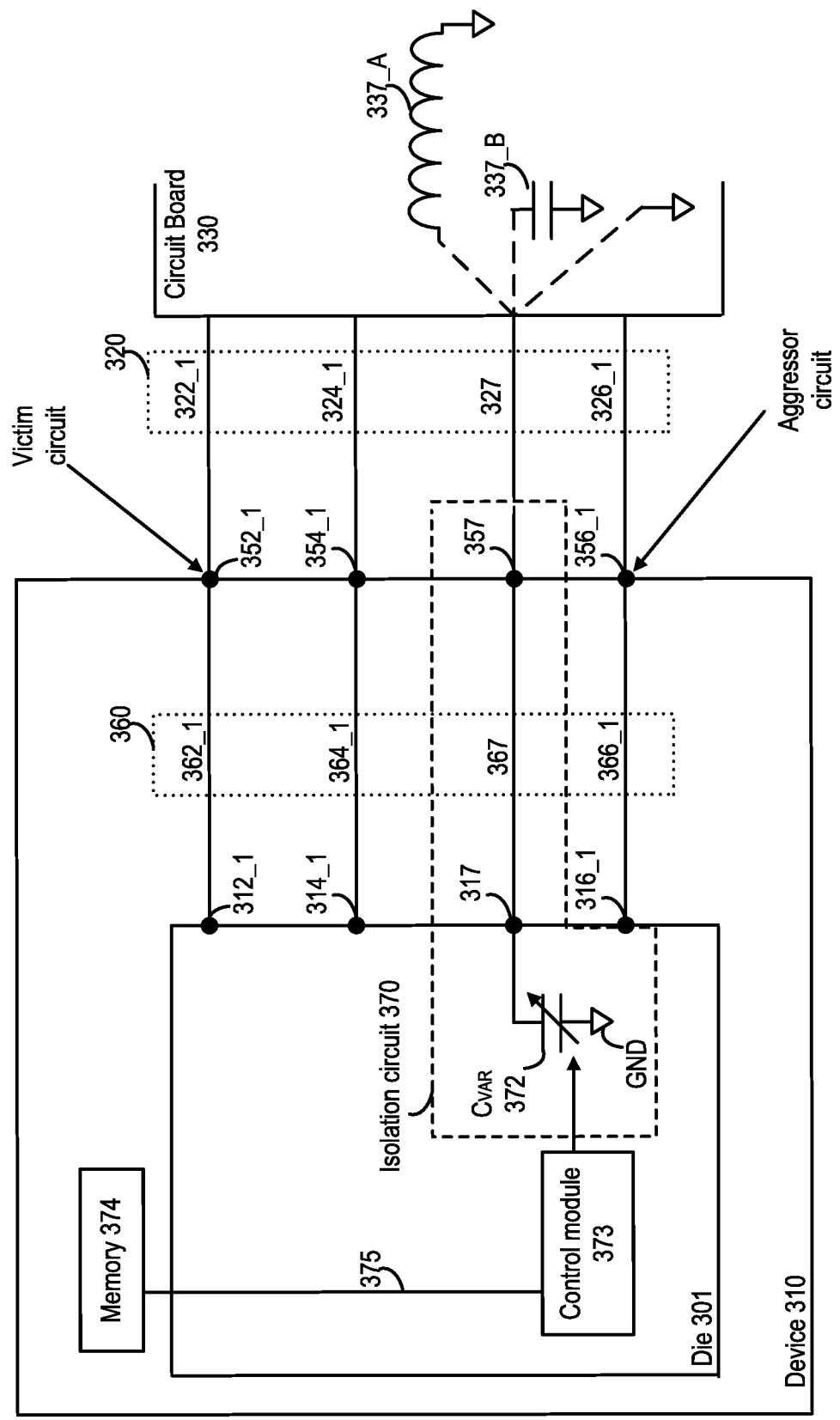
FIG. 3 illustrates an apparatus incorporating an isolation circuit to adjust isolation between I/O ports and/or between wirings outside of a die, in accordance with certain aspects of present disclosure.

FIG. 3 illustrates an apparatus 300 incorporating an isolation circuit 370 to adjust isolation between I/O ports and/or between wirings associated with a device 310, in accordance with certain aspects of present disclosure. FIG. 3 includes, as an example, a device 310 incorporating a die 301. The device 310 may be, for example, quad-flat no-leads or QFN package, and may be a functional substitute for the device 110 in the apparatus 100, as illustrated in FIG. 1 (e.g., an instance of the device 110 with additional circuitries or modifications). The device 310 may include an I/O port 352_1 (e.g., an example of the I/O port 152_1 of FIG. 1), an I/O port 354_1 (e.g., an example of the I/O port 154_1 of FIG. 1), an I/O port 357, and an I/O port 356_1 (e.g., an example of the I/O port 156_1 of FIG. 1). These I/O ports may be, for example, I/O pins (e.g., pins, balls, stubs, etc.) of the device 310.

The I/O ports of the device 310 may electrically connect to the circuit board 330 via wiring 320 (which may be an example of the wiring 120 of FIG. 1). The circuit board 330 may be an instance of the circuit board 130 of FIG. 1. The wiring 320 may include a wiring 322_1 (e.g., an example of the wiring 122_1 of FIG. 1), a wiring 324_1 (e.g., an example of the wiring 124_1 of FIG. 1), a wiring 327, and a wiring 326_1 (e.g., an instance of the wiring 126_1 of FIG. 1). The wiring 322_1 may be electrically connected to the I/O port 352_1. The wiring 324_1 may be electrically connected to the I/O port 354_1. The wiring 376 may be electrically connected to the I/O port 357. The wiring 326_1 may be electrically connected to the I/O port 356_1.

The die 301 may be, for example, a transceiver die including at least one processor. The at least one processor may be coupled with a memory 374 via a bus system 375 to perform RF functions of the transceiver. For example, the at least one processor may operate with the memory 374, at least in part, to perform the functions of the first chain of RF circuits 140_1 and/or second chain of RF circuits 140_2 (FIG. 1). For example, the at least one processor may receive data, instructions, or parameters for RF functions from the memory 374 via the bus system 375. In some examples, the die 301 include the memory 374. In some examples, the memory 374 is outside of the die 301.

The die 301 may include various I/O bond pads. The I/O bond pads electrically connect to the I/O ports of the device 310 via wiring 360 outside of the die 301. The wiring 360 may include, for example, a wiring 362_1, a wiring 364_1, a wiring 367, and/or a wiring 366_1. A I/O bond pad 312_1 may be electrically connected to the I/O port 352_1 via the wiring 362_1. A I/O bond pad 314_1 may be electrically connected to the I/O port 354_1 via the wiring 364_1. A I/O bond pad 317 may be electrically connected to the I/O port 357 via the wiring 367. A I/O bond pad 316_1 may be electrically connected to the I/O port 356_1 via the wiring 366_1. In some examples, the I/O bond pads of the die 301 may be examples of the I/O ports of the present disclosure.

In a case of coupling (e.g., coupling 102 of FIG. 1), the I/O port 356_1, the wiring 326_1, the I/O bond pad 316_1, and/or the wiring 366_1 may be part of an aggressor circuit (e.g., causing an interference). The I/O port 352_1, the wiring 322_1, the I/O bond pad 312_1, and/or the wiring 362_1 may be part of a victim circuit (signals carried thereon being distorted by the interference). FIG. 3 illustrates an isolation circuit 370 to adjust isolation (e.g., to improve isolation by reducing coupling) between the aggressor and the victim without having to increase a distance between the aggressor and the victim.

The isolation circuit 370 may include, for example, a variable capacitor 372 (e.g., incorporated within the die 301; semiconductor layers of the die 301 constituting the variable capacitor 372), the I/O bond pad 317, the wiring (outside of the die 301) 367, the I/O port 357, and/or the wiring (outside of the device 310) 327. The isolation circuit 370 may be connected to various passive elements on the circuit board 330. For example, the isolation circuit 370 may further include an inductor 337_A or a capacitor 337_B electrically connected to the I/O port 357, via the wiring 327. Alternatively, the isolation circuit 370 may electrically connect to ground on the circuit board 330. As presented below, a control module 373 (e.g., as part of the at least one processor operating at least in part with the memory 374) may dynamically tune the variable capacitor 372 (e.g., adjust a capacitance setting) to actively attenuate or cancel coupling (e.g., the coupling 102 of FIG. 1) between the aggressor circuit and the victim circuit. In some examples, isolation circuit 370 may be dedicated to isolation improvement and does not perform intended RF functions (or any other functions in general).

In some example, the control module 373 may adjust a setting of the variable capacitor 373 (to improve isolation between I/O ports by reducing coupling) based on a measurement or simulation result of potential, undesired coupling (e.g., the coupling 102 of FIG. 1). In some examples, the control module 373 may adjust the setting of the variable capacitor 373 based on a determination of undesired coupling. Referring to FIG. 1, the control module 148_1 may be configured to determine such undesired coupling based on, for example, information received via the I/O port 156_1. Such determination may be made for changing operating conditions (e.g., when and where there are weak RF signaling) and/or for changing operating modes (e.g., the device 110 changes among different radio access technologies). In response, the control module 373 may actively and dynamically adjust the setting of the variable capacitor 373 to improve isolation between I/O ports, in response to changing operating conditions or operating modes.

For example, the at least one processor (e.g., the control module 373) operates at least in part with the memory 374 to adjust the setting of the variable capacitor 372. The at least one processor may receive data, instructions, or parameters to adjust the setting of the variable capacitor 372 from the memory 374 via the bus system 375. In some examples, the die 301 include the memory 374. In some examples, the memory 374 is outside of the die 301.

Figure 4:
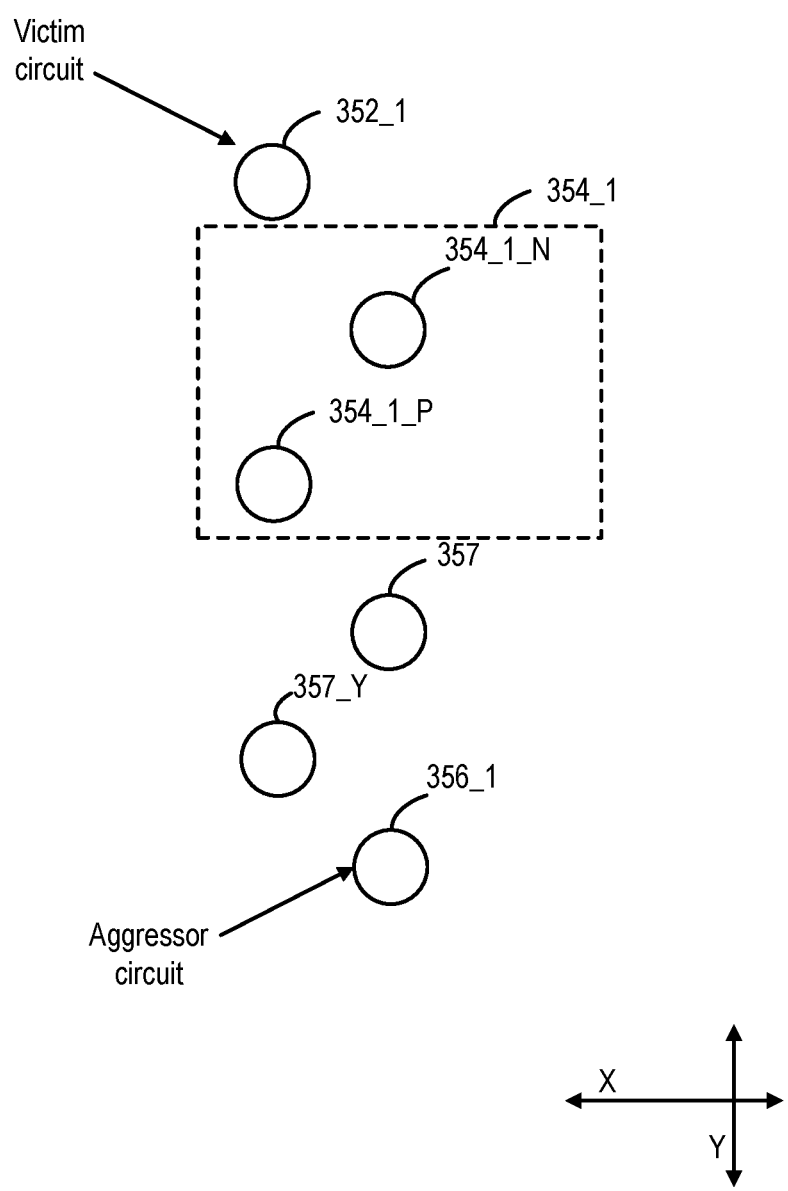
FIG. 4 illustrates physical placements of the I/O ports of FIG. 3, in accordance with certain aspects of the present disclosure.

FIG. 4 illustrates physical placements of the I/O ports of FIG. 3, in accordance with certain aspects of the present disclosure. X-axis is shown in the horizontal direction, and Y-axis is shown in the vertical direction. FIG. 4 includes the I/O port 352_1 (victim circuit; FIG. 3), the I/O port 354_1 (FIG. 3). The I/O port 354_1 may include a positive terminal 354_1_P and a negative terminal 354_1_N, in a case the received RF signals being differential signals. FIG. 4 may further include the I/O port 357, which may be part of the isolation circuit 370 (FIG. 3), and the I/O port 356_1 (aggressor circuit see FIG. 3). The I/O port 357 is (physically) disposed between the I/O port 352_1 (the victim circuit) and the I/O port 356_1 (the aggressor circuit), at least in the Y-axis, to adjust or to improve isolation therebetween. An I/O port 357_Y is likewise (physically) disposed between the I/O port 352_1 (the victim circuit) and the I/O port 356_1 (the aggressor circuit), at least in the Y-axis, to adjust or to improve isolation therebetween. The I/O port 357_Y will be presented with FIG. 6.

Figure 5:
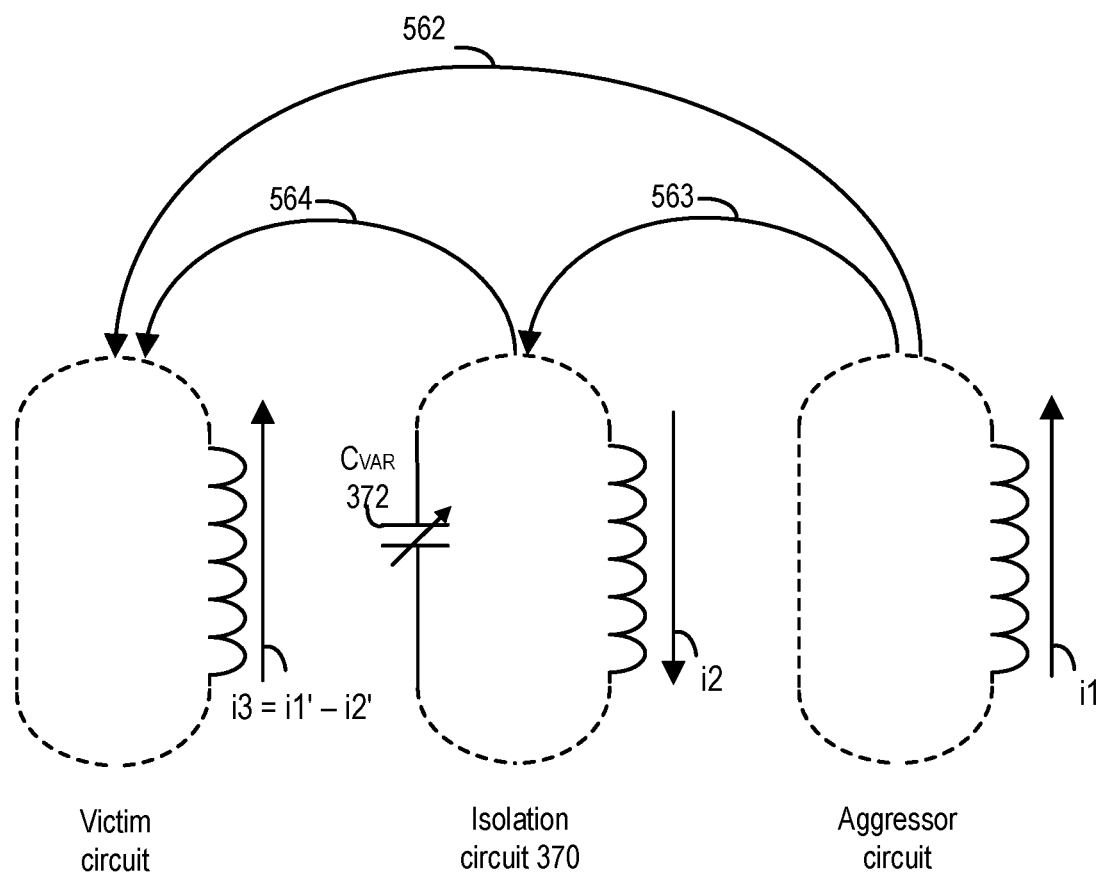
FIG. 5 illustrates operation of the isolation circuit of FIG. 3, in accordance with certain aspects of the present disclosure.

FIG. 5 illustrates operation of the isolation circuit 370 of FIG. 3, in accordance with certain aspects of the present disclosure. FIG. 5 includes an aggressor circuit (e.g., the aggressor circuit of FIG. 3, a circuit coupled to the I/O port 356_1) illustrated as an inductor, the isolation circuit 370 (FIG. 3) illustrated as an inductor, and a victim circuit (e.g., the victim circuit of FIG. 3; a circuit coupled to the I/O port 352_1) illustrated as an inductor. The aggressor circuit has a current it flowing therethrough during operation of an RF function (e.g., functions of the first chain of RF circuits 140_1 and/or the second chain of RF circuits 140_2 presented with FIG. 1). The aggressor circuit may be coupled to the victim circuit via a coupling 562, creating a current i1' flowing in the victim circuit. The aggressor circuit may also be coupled to the isolation circuit 370 via a coupling 563, creating a current i2 flowing therein.

The isolation circuit 370 may be coupled to the victim circuit via a coupling 564, creating a current i2' flowing in the victim circuit. The current i2 flowing in the isolation circuit 370 may be tuned by the variable capacitor 372. In such fashion, the control module 373 (e.g., as part of the at least one processor operating at least in part with the memory 374) may change a capacitance setting of the variable capacitor 372 to adjust the current i2' flowing in the victim circuit. The victim circuit may have a current i3 flowing therethrough, the current i3 being a result of the coupling 562 and the coupling 564. The current i3 may be expressed i1'−i2'. Accordingly, the variable capacitor 372 may be tuned to adjust the current i2, such that the current i3 is zero at a desired frequency range (e.g., tuning i2' to equal i1').

Figure 6:
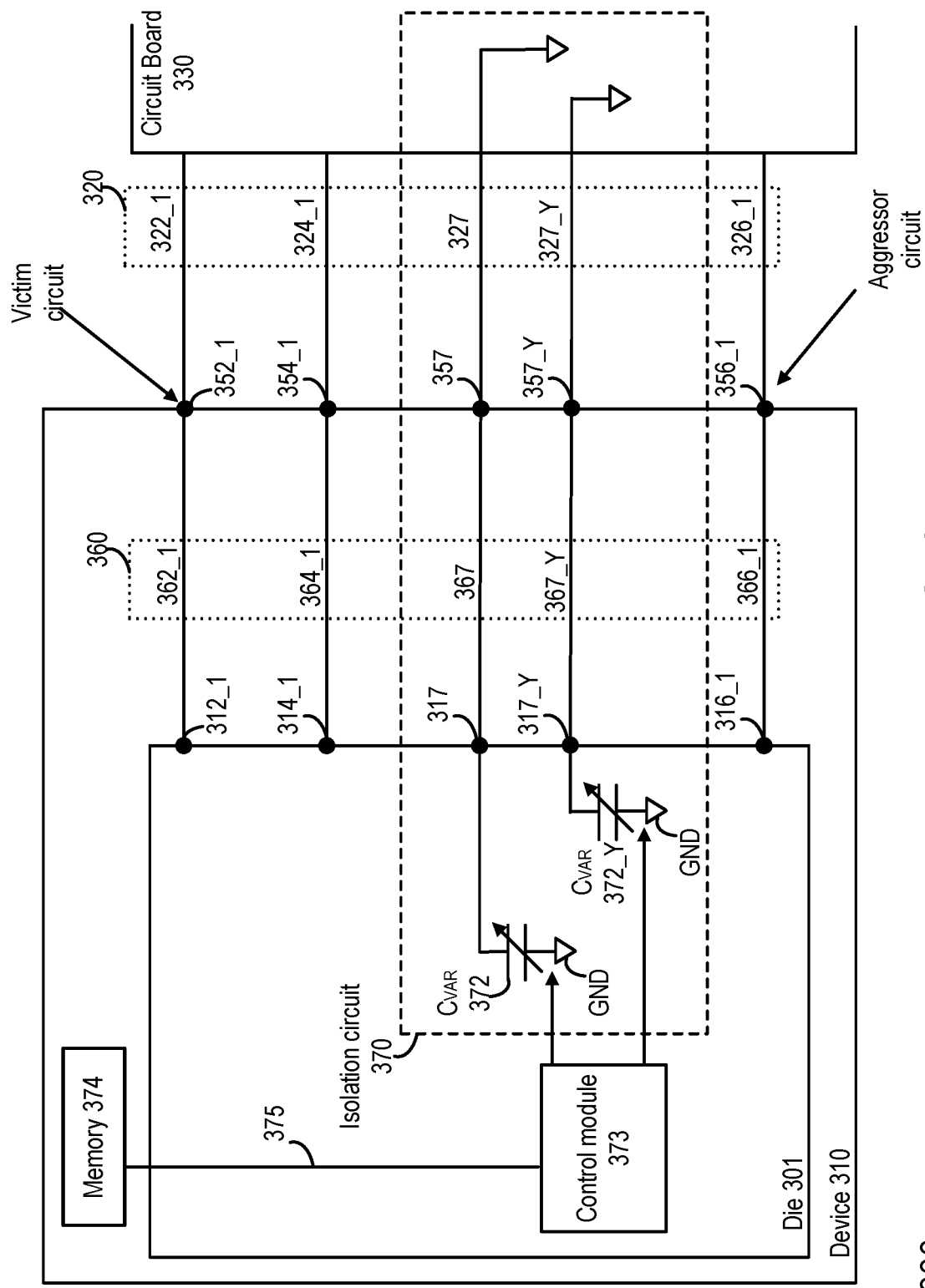
FIG. 6 illustrates another implementation of the isolation circuit of FIG. 3, in accordance with certain aspects of the present disclosure.
Figure 8:
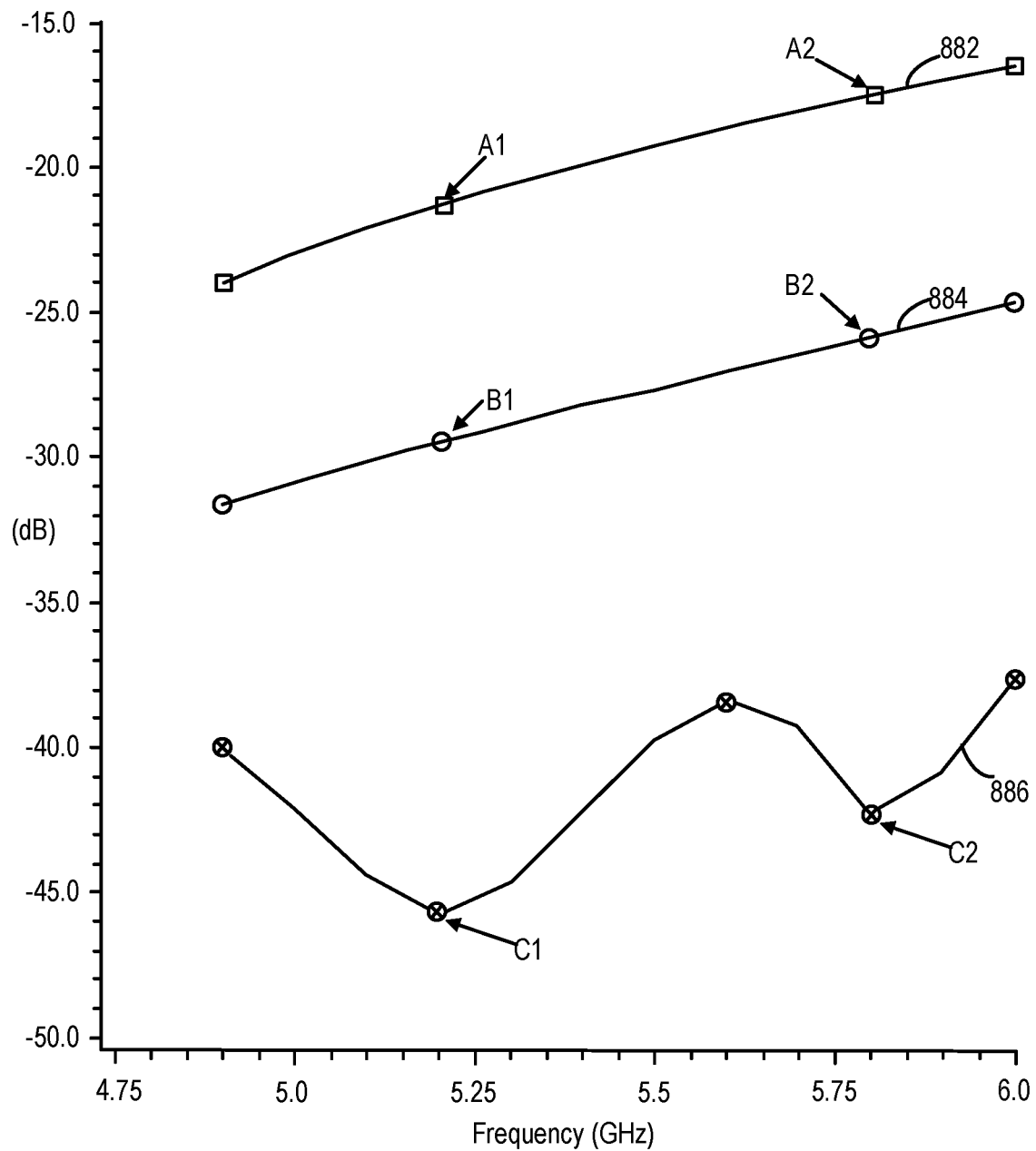
FIG. 8 illustrates isolation performance for various schemes, including the isolation circuit of FIG. 6, in accordance with certain aspects of the present disclosure.

FIG. 6 illustrates another implementation of the isolation circuit 370 of FIG. 3, in accordance with certain aspects of the present disclosure. FIG. 6 illustrates that the isolation circuit 370 may include multiple I/O ports (and/or wiring outside of the device 310 or outside of the die 301 of FIG. 3) to adjust or improve isolation at multiple operating frequencies. For example, FIG. 6 illustrates that the isolation circuit 370 may include a second variable capacitor 372_Y, an additional I/O bond pad 317_Y, an additional wiring 367_Y outside of the die 301, an additional I/O port 357_Y, an additional wiring 327_Y outside of the device 310, and/or additional ground or passive components on the circuit board 330. The second variable capacitor 372_Y may be electrically connected to the additional I/O bond pad 317_Y. The additional wiring 367_Y outside of the die 301 may electrically connect the additional I/O bond pad 317_Y and the additional I/O port 357_Y. The additional wiring 327_Y outside of the device 310 may electrically connect the additional I/O port 357_Y and the circuit board 330. The control module 373 (e.g., as part of the at least one processor operating in part with the memory 374) may dynamically and actively tune the second variable capacitor 372_Y (e.g., adjust a capacitance setting thereof) to reduce coupling at a second frequency. A second operating frequency at which coupling is reduced may be different from a first operating frequency at which coupling is reduced, by the variable capacitor 372. See FIG. 8 presented below.

In some example, the control module 373 may adjust a setting of the variable capacitor 373_Y (to improve isolation between I/O ports) based on a measurement or simulation result of potential, undesired coupling (e.g., the coupling 102 of FIG. 1). In some examples, the control module 373 may adjust the setting of the variable capacitor 373_Y (to improve isolation between I/O ports) based on a determination of undesired coupling. Referring to FIG. 1, the control module 148_1 may be configured to determine such undesired coupling based on, for example, information received via the I/O port 156_1. Such determination may be made for changing operating conditions (e.g., when and where there are weak RF signaling) and/or for changing operating modes (e.g., the device 110 changes among different radio access technologies). In response, the control module 373 may actively and dynamically adjust the setting of the variable capacitor 373_Y to improve isolation between I/O ports, in response to changing operating conditions or operating modes.

For example, the at least one processor (e.g., the control module 373) operates at least in part with the memory 374 to adjust the setting of the variable capacitor 372_Y. The at least one processor may receive data, instructions, or parameters to adjust the setting of the variable capacitor 372_Y from the memory 374 via the bus system 375. In some examples, the die 301 include the memory 374. In some examples, the memory 374 is outside of the die 301

Figure 7:
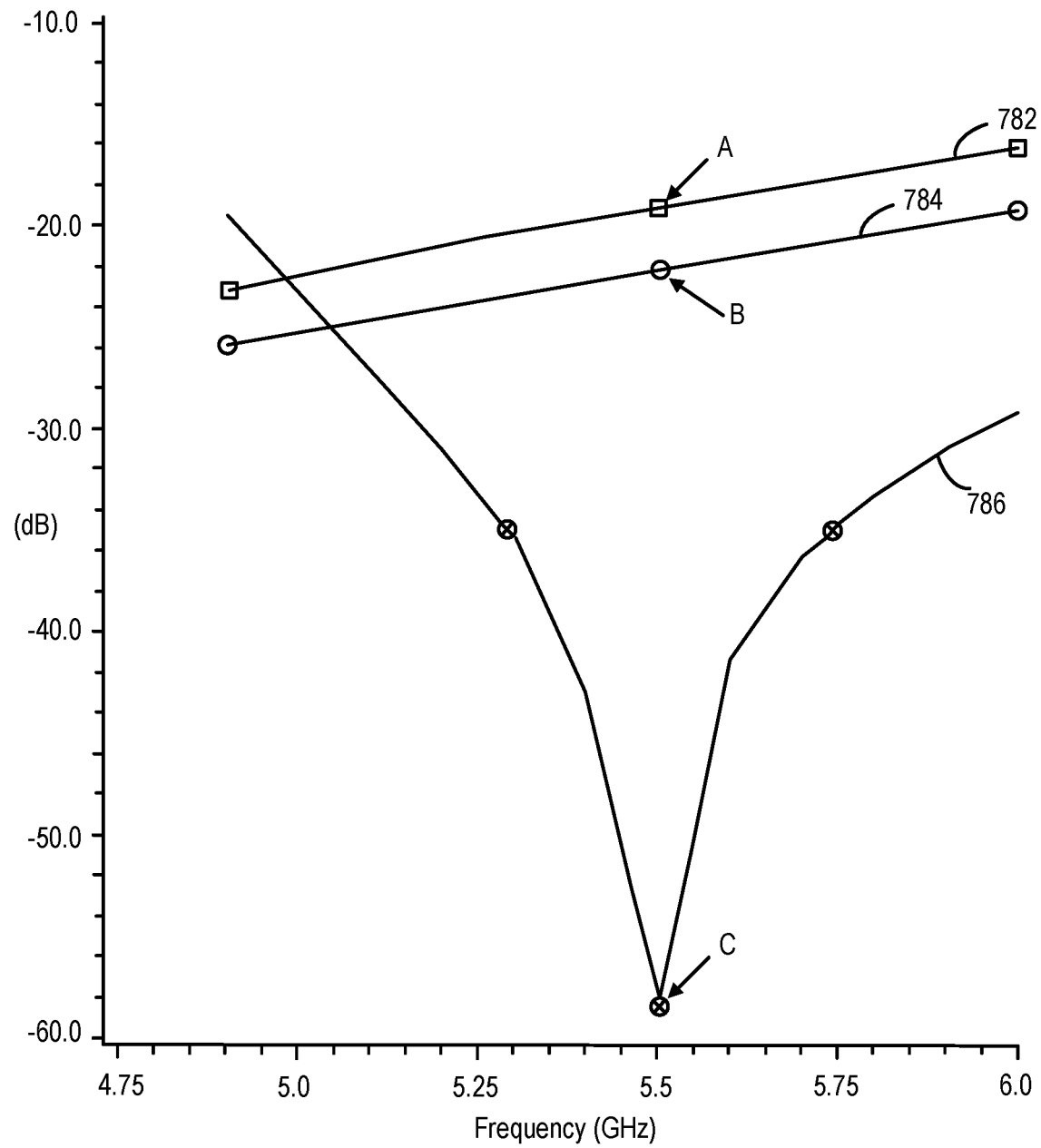
FIG. 7 illustrates isolation performance for various schemes, including the isolation circuit of FIG. 3, in accordance with certain aspects of the present disclosure.

FIG. 7 illustrates isolation performance for various schemes, including the isolation circuit 370 of FIG. 3, in accordance with certain aspects of the present disclosure. Operating frequency (e.g., of the device 310 of FIG. 3) is shown as the X-axis, and isolation expressed as dB is shown as the Y-axis. FIG. 7 includes an isolation curve 782, an isolation curve 784, and an isolation curve 786. The isolation curve 782 is a result of, for example, isolation between the I/O port 352_1 and the I/O port 356_1 (FIG. 3) without any isolation circuit (e.g., without the isolation circuit 370 of FIG. 3). At point A, at an operating frequency of 5.5 GHz (which may be an operating frequency needing the best isolation), the isolation curve 782 shows isolation of about 20 dB.

The isolation curve 784 is also a result of, for example, isolation between the I/O port 352_1 and the I/O port 356_1 (FIG. 3) without operations of the variable capacitor 372. For example, for the isolation curve, the capacitance of the variable capacitor 372 and the variable capacitor 372_Y may be considered to be at zero. For the isolation curve 784, referring to FIG. 3, the I/O bond pad 317, the wiring 367 outside of the die 301, and/or the I/O port 357 (without the variable capacitor 372) may be grounded. At point B, at the operating frequency of 5.5 GHz, the isolation curve 784 shows some improvement at 25 dB.

The isolation curve 786 is a result of, for example, isolation between the I/O port 352_1 and the I/O port 356_1 (FIG. 3) having the variable capacitor 372 (FIG. 3) dynamically and actively tuned to improve isolation at a desired operating frequency (e.g., 5.5 GHz). At point C, at the operating frequency of 5.5 GHz, the isolation curve 786 shows vastly improved isolation at 58 dB. Referring to FIG. 3, the control module 373 may be configured to dynamically and actively tune the variable capacitor 372 to achieve the improved isolation (e.g., to adjust the variable capacitor 372 to account for process variation and/or the desired operating frequency). Moreover, the desired operating frequency at which the variable capacitor 372 operates to reduce coupling may be effected by the passive components (e.g., the inductor 337_A, the capacitor 337_B, and/or ground on the circuit board 330 at FIG. 3) of the circuit board 330.

FIG. 8 illustrates isolation performance for various schemes, including the isolation circuit 370 of FIG. 6, in accordance with certain aspects of the present disclosure. Operating frequency (e.g., of the device 310 of FIG. 6) is shown as the X-axis, and isolation expressed as dB is shown as the Y-axis. FIG. 8 includes an isolation curve 882, an isolation curve 884, and an isolation curve 886. The isolation curve 882 may a result of, for example, isolation between the I/O port 352_1 and the I/O port 356_1 (FIG. 6) without any isolation circuit (e.g., without the isolation circuit 370 of FIG. 6). At point A1, at a first desired operating frequency of 5.2 GHz (which may be an operating frequency needing improved isolation), the isolation curve 882 shows isolation of about 21 dB. At point A2, at a second desired operating frequency of 5.8 GHz (which may be another operating frequency needing improved isolation), the isolation curve 882 shows isolation of about 19 dB.

The isolation curve 884 may result from isolation between the I/O port 352_1 and the I/O port 356_1 (FIG. 6) without operations of the variable capacitor 372 and the variable capacitor 372_Y (FIG. 6). For example, for the isolation curve, the capacitance of the variable capacitor 372 and the variable capacitor 372_Y may be considered to be at zero. For the isolation curve 884, referring to FIG. 6, the I/O bond pad 317 and the I/O bond pad 317_Y, the wiring 367 and the wiring 367_Y outside of the die 301, and/or the I/O port 357 and the I/O port 357_Y (without the variable capacitor 372 and without the variable capacitor 372_Y) may be grounded to improve isolation. At point B1, at the operating frequency of 5.2 GHz, the isolation curve 884 shows some improvement at 30 dB. At point B2, at the operating frequency of 5.8 GHz, the isolation curve 884 shows some improvement at 26 dB.

The isolation curve 886 may be a result of, for example, isolation between the I/O port 352_1 and the I/O port 356_1 (FIG. 6) having the variable capacitor 372 and the variable capacitor 372_Y (FIG. 6) dynamically and actively tuned to nullified coupling (e.g., the coupling 102 of FIG. 1) at a first desired operating frequency (e.g., 5.2 GHz) and a second desired operating frequency (e.g., 5.8 GHz). At point C1, at the operating frequency of 5.2 GHz, the isolation curve 886 shows improved isolation at 46 dB. At point C2, at the operating frequency of 5.8 GHz, the isolation curve 886 shows improved isolation at 42 dB. Referring to FIG. 6, the control module 373 (e.g., as part of the at least one processor operating with the memory 374 in part) may be configured to dynamically, actively, and/or individually tune the variable capacitor 372 and the variable capacitor 372_Y to achieve the improved isolation at two different, desired operating frequencies. For example, the control module 373 may tune the variable capacitor 372 to nullify coupling at a first desired operating frequency (e.g., at 5.2 GHz) and tune the variable capacitor 372_Y to nullify coupling at a second desired operating frequency (e.g., at 5.8 GHz). Moreover, the desired operating frequencies may be further effected by the passive components (e.g., the inductor 337_A, the capacitor 337_B, and/or ground on the circuit board 330 at FIG. 3) of the circuit board 330.

Figure 9:
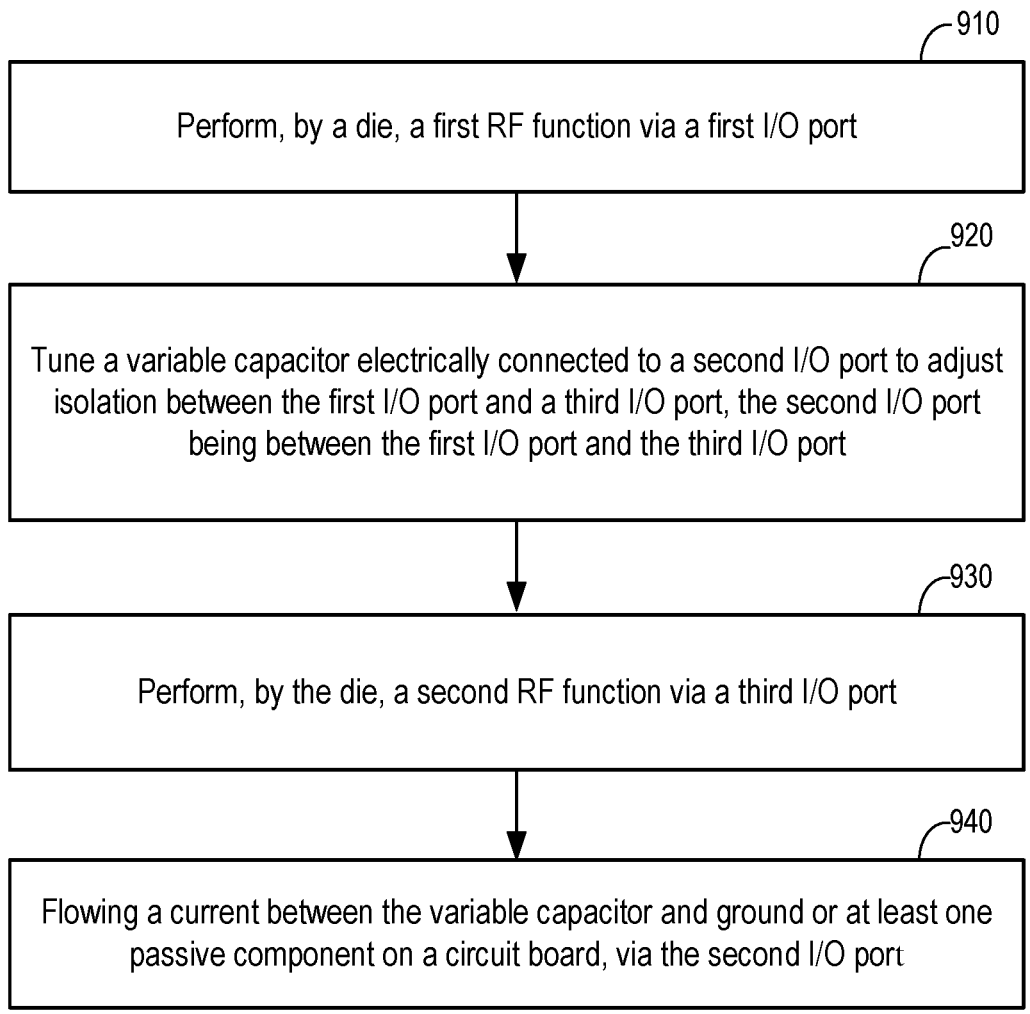
FIG. 9 illustrates a method to adjust isolation among I/O ports, in accordance with certain aspects of the disclosure.

FIG. 9 illustrates a method to adjust isolation among I/O ports, in accordance with certain aspects of the disclosure. The operations of FIG. 9 may be implemented by, for example, the apparatus 300 of FIG. 3 or FIG. 6. The arrows indicate certain relationships among the operations, but not necessarily sequential relationships. At 910, a first RF function is performed by a die, via a first I/O port. For example, referring to FIG. 3, the apparatus 300 may include a device 310 and/or a circuit board 330. The device 310, which may be a packaged chip, a multi-die assembly, a multi-chip assembly, or a mixed-chip-die assembly, may include therein the die 301. In some examples, the die 301 may include at least one processor performing various transceiver functions (e.g., the die 301 include a transceiver having at least one processor). The die 301 (e.g., the at least one processor) is coupled to a memory 374, via a bus system 375, to perform the transceiver functions (RF functions; transmitting and/or receiving RF signals). The I/O port 352_1 (e.g., the first I/O port) may be in instance of the I/O port 152_1 and a part of the first chain of RF circuits 140_1 (FIG. 1). The device 310 (e.g., the device 110 of FIG. 1) may include the die 301 to transmit RF signals (e.g., the first RF function) via the I/O port 352_1. The at least one processor may operate with the memory 374, at least in part, to perform RF functions of the first chain of RF circuits 140_1 (FIG. 1). For example, the at least one processor may receive instructions or parameters for the RF functions from the memory 374 via the bus system 375.

At 920, a variable capacitor electrically connected to a second I/O port is tuned to adjust isolation between the first I/O port and a third I/O port, the second I/O port being between the first I/O port and the third I/O port. Referring to FIG. 3, for example, the variable capacitor 372 may be incorporated within the die 301 (e.g., semiconductor layers of the die 301 configured as the variable capacitor 372). The variable capacitor 372 may be electrically connected to the I/O port 357 (e.g., the second I/O port). The die 301 (e.g., the at least one processor), via the control module 373, tunes the variable capacitor 372 to reduce a coupling (e.g., the coupling 102 of FIG. 1) between the I/O port 352_1 (e.g., the first I/O port) and the I/O port 356_1 (e.g., the third I/O port). In such fashion, isolation between the I/O port 352_1 (e.g., the first I/O port) and the I/O port 356_1 (e.g., the third I/O port) is adjusted or improved. See an operating example presented with FIG. 5. The I/O port 357 (e.g., the second I/O port) may be physically disposed between the I/O port 352_1 (e.g., the first I/O port) and the I/O port 356_1 (e.g., the third I/O port)(see FIG. 4).

In some examples, the control module 373 adjusts the setting of the variable capacitor 373 (to improve isolation between I/O ports) based on a determination of undesired coupling. Referring to FIG. 1, the control module 148_1 may be configured to determine such undesired coupling based on, for example, information received via the I/O port 156_1. Such determination is made for changing operating conditions (e.g., when and where there are weak RF signaling) and/or for changing operating modes (e.g., the device 110 changes among different radio access technologies). In response, the control module 373 actively and dynamically adjusts the setting of the variable capacitor 373 to improve isolation between I/O ports, in response to changing operating conditions or operating modes.

At 930, a second RF function is performed by the die via a third I/O port. For example, referring to FIG. 3, the I/O port 356_1 (e.g., the third I/O port) may be in instance of the I/O port 156_1 and receives RF signal information from the second chain of RF circuits 140_2 (FIG. 1). The device 310 (e.g., the device 110 of FIG. 1) may include the die 301 to receive RF signal information (e.g., the second RF function) via the I/O port 356_1. The first RF function performed via the I/O port 352_1 (e.g., as part of the first chain of RF circuits 140_1 of FIG. 1) and the second RF function performed via the I/O port 356_1 (e.g., receiving RF information from the second chain of RF circuits 140_2 of FIG. 1) may be part of MIMO functions, and the I/O port 352_1 and the I/O port 356_1 may be part of a MIMO system. For example, the first chain of RF circuits 140_1 and the second chain of RF circuits 140_2 of FIG. 1 may transmit and receive RF signals to different antennae of the MIMO system. In some examples, the I/O port 352_1 (e.g., the first I/O port), the first I/O port, the second I/O port, and/or the third I/O port may be pins of the device 310.

In some examples, the first I/O port, the second I/O port, and the third I/O port may be I/O bond pads of the die 301. For example, the I/O bond pad 312_1 (the first I/O port) of the die 301 (FIG. 3) may be an instance of the I/O port 152_1 of FIG. 1. The I/O bond pad 316_1 (the second I/O port) of the die 301 (FIG. 3) may be an instance of the I/O port 156_1 of FIG. 1. The I/O bond pad 317 may correspond to the second I/O port. In such fashion, the variable capacitor 372 is tuned to reduce coupling (e.g., the coupling 102 of FIG. 1) between the I/O bond pad 312_1 and the I/O bond pad 316_1 of the die 301 (FIG. 3).

At 940, a current is flowed between the variable capacitor and ground or at least one passive component on a circuit board, via the second I/O port. Referring to FIG. 3, for example, the circuit board 330 may include passive elements (e.g., the inductor 337_A and the capacitor 337_B) and ground. The die 301 (e.g., the at least one processor via the control module 373) may tune the variable capacitor 372 to reduce coupling and to improve isolation among I/O ports, as presented with FIG. 9. The variable capacitor 372 is electrically connected to the inductor 337_A, the capacitor 337_B and/or ground (e.g., via the I/O bond pad 317 and the I/O port 357) and thereby flows a current therebetween. See, for example, the current i2 in FIG. 5. In some examples, the isolation circuit 370 performs on RF functions (e.g., the die 301 performs no RF functions via the I/O bond pad 317 and the I/O port 357). For example, the isolation circuit 370 performs only isolation improvement function presented above. The isolation circuit 370, including the variable capacitor 372, is not electrically connected (e.g., there is no electrical energy flowing via a capacitor, resistor, inductor, or wire) and/or intentionally coupled to one or more antenna to perform intended RF functions, such as transmitting or receiving RF signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus, comprising:
   a first input or output (I/O) port, a second I/O port, and a third I/O port of a device, wherein the first, second, and third I/O ports are electrically coupled to a circuit board outside the device that includes at least a portion of a radio frequency (RF) chain, the second I/O port located between the first I/O port and the third I/O port wherein the first, second, and third I/O ports are located along at least one geometric axis; and
   a variable capacitor in the device and electrically connected to the second I/O port and configurable to adjust isolation between the first I/O port and the third I/O port, wherein the variable capacitor is not electrically connected to an antenna contained in the circuit board.

2. The apparatus of claim 1, the device further comprising a die, wherein the variable capacitor is incorporated within the die.

3. The apparatus of claim 2, wherein the first I/O port, the second I/O port, and the third I/O port comprising I/O bond pads of the die.

4. The apparatus of claim 2, wherein the device comprises a packaged chip, a multiple-die assembly, a multi-chip assembly, or a mixed-chip-die assembly.

5. The apparatus of claim 4, wherein the first I/O port, the second I/O port, and the third I/O port comprising pins of the device.

6. The apparatus of claim 5, further comprising:
   ground or at least one passive component on the circuit board, the ground or the at least one passive component being electrically connected to the variable capacitor via the second I/O port.

7. The apparatus of claim 2, wherein the first I/O port and the third I/O port are part of a multiple-input and multiple-output system.

8. The apparatus of claim 2, further comprising:
   a fourth I/O port;
   a second variable capacitor electrically connected to the fourth I/O port and configured to adjust isolation between the first I/O port and the third I/O port, the fourth I/O port being between the first I/O port and the third I/O port.

9. The apparatus of claim 2, further comprising one of a computing system, a mobile computing system, an Internet of Things device, virtual reality system, or augmented reality system incorporating the die, the first I/O port, the second I/O port, and the third I/O port.

10. The apparatus of claim 1, the first I/O port or the third I/O port being coupled to the antenna on the circuit board to perform an RF function.

11. The apparatus of claim 10,
    the antenna comprising a first antenna or a second antenna,
    the RF function being a first RF function or a second RF function,
    the first I/O port being coupled to the first antenna to perform the first RF function, and
    the third I/O port being coupled to the second antenna to perform the second RF function.

12. A method to adjust isolation among I/O ports, comprising:
performing, by a die, a first radio frequency (RF) function via a first I/O port;
tuning a variable capacitor electrically connected to a second I/O port to adjust isolation between the first I/O port and a third I/O port, the second I/O port located between the first I/O port and the third I/O port wherein the first, second, and third I/O ports are located along at least one geometric axis, and wherein the variable capacitor is not electrically connected to an antenna in a circuit board outside the die and electrically coupled to the die via at least one of the first, second, or third I/O ports; and
performing, by the die, a second RF function via the third I/O port.

13. The method of claim 12, wherein the variable capacitor is incorporated within the die.

14. The method of claim 13, wherein the first I/O port, the second I/O port, and the third I/O port comprising I/O bond pads of the die.

15. The method of claim 13, wherein the die is incorporated into a device, and wherein the device comprises a packaged chip, a multiple-die assembly, a multi-chip assembly, or a mixed-chip-die assembly.

16. The method of claim 15, wherein the first I/O port, the second I/O port, and the third I/O port comprising pins of the device.

17. The method of claim 13, wherein tuning the variable capacitor to adjust isolation between the first I/O port and the third I/O port comprises flowing a current between the variable capacitor and ground or at least one passive component on the circuit board via the second I/O port.

18. The method of claim 13, wherein the first RF function and the second RF function comprising multiple-input and multiple-output functions.

19. The method of claim 13, further comprising:
tuning a second variable capacitor electrically connected to a fourth I/O port to adjust isolation between the first I/O port and the third I/O port, the fourth I/O port being between the first I/O port and the third I/O port.

20. The method of claim 12, the first I/O port or the third I/O port being coupled to the antenna to perform the first RF function or a second RF function.

21. The method of claim 20,
the antenna comprising a first antenna or a second antenna,
the first I/O port being coupled to the first antenna to perform the first RF function, the third I/O port being coupled to the second antenna to the second RF function.

22. An apparatus with adjustable isolation among I/O ports, the apparatus comprising:
a memory;
at least one processor coupled to the memory;
a first I/O port;
a second I/O port; and
a third I/O port, wherein the at least one processor is configured to, at least in part with the memory,
perform a first RF function via the first I/O port;
tune a variable capacitor to adjust isolation between the first I/O port and the third I/O port, the variable capacitor being electrically connected to the second I/O port, and the second I/O port located between the first I/O port and the third I/O port wherein the first, second, and third I/O ports are located along at least one geometric axis; and
perform a second RF function via the third I/O port,
wherein the variable capacitor is not electrically connected to an antenna in a circuit board outside the die and electrically coupled to the die via at least one of the first, second, or third I/O ports.

23. The apparatus of claim 22, further comprising a die, wherein the variable capacitor is incorporated within the die.

24. The apparatus of claim 23, wherein the first I/O port, the second I/O port, and the third I/O port comprising I/O bond pads of the die.

25. The apparatus of claim 23, wherein the die is incorporated into a device, and wherein the device comprises a packaged chip, a multiple-die assembly, or a multi-chip assembly.

26. The apparatus of claim 25, wherein the first I/O port, the second I/O port, and the third I/O port comprising pins of the device.

27. The apparatus of claim 23, wherein the at least one processor is configured to tune the variable capacitor to adjust isolation between the first I/O port and the third I/O port by flowing a current between the variable capacitor and ground or at least one passive component on the circuit board via the second I/O port.

28. The apparatus of claim 23, wherein the first RF function and the second RF function comprising multiple-input and multiple-output functions.

29. The apparatus of claim 23, further comprising:
a fourth I/O port; and
a second variable capacitor electrically connected to the fourth I/O port, wherein the at least one processor is further configured to, at least in part with the memory, tune the second variable capacitor to adjust isolation between the first I/O port and the third I/O port, the fourth I/O port being between the first I/O port and the third I/O port.

30. The apparatus of claim 23, wherein the at least one processor is incorporated into a device, and wherein the device comprises one of a packaged chip, a multiple-die assembly, a multi-chip assembly, or a mixed-chip-die assembly, and wherein the first I/O port, the second I/O port, and the third I/O port comprising pins of the device.

31. The apparatus of claim 23, further comprising one of a computing system, a mobile computing system, an Internet of Things device, virtual reality system, or augmented reality system incorporating the die, the at least one processor, the first I/O port, the second I/O port, and the third I/O port.

32. The apparatus of claim 23, the first I/O port or the third I/O port being coupled to the antenna to perform an RF function.

33. The apparatus of claim 32,
the antenna comprising a first antenna or a second antenna,
the RF function being a first RF function or a second RF function,
the first I/O port being coupled to the first antenna to perform the first RF function, and
the third I/O port being coupled to the second antenna to the second RF function.

* * * * *